United States Patent [19]
Kato et al.

[11] 4,084,119
[45] Apr. 11, 1978

[54] CHOPPER CONTROL SYSTEM

[75] Inventors: Hidetoshi Kato, Nagoya; Masayoshi Niimi, Toyota; Kenzo Mitani, Anjo, all of Japan

[73] Assignee: Nippondenso Co., Ltd., Kariya, Japan

[21] Appl. No.: 663,994

[22] Filed: Mar. 4, 1976

[30] Foreign Application Priority Data

Mar. 19, 1975 Japan .................................. 50-33556

[51] Int. Cl.² .............................................. H02P 7/00
[52] U.S. Cl. .................................... 318/434; 318/341; 318/139
[58] Field of Search ................. 318/139, 341, 331, 434

[56] References Cited

U.S. PATENT DOCUMENTS

| 3,541,416 | 11/1970 | Woyton | 318/331 |
| 3,562,611 | 2/1971 | Gurwicz | 318/341 |
| 3,588,654 | 6/1971 | Balazs | 318/331 |
| 3,624,475 | 11/1971 | Smith | 318/341 |
| 3,683,253 | 8/1972 | Rummel et al. | 318/341 |
| 3,818,291 | 6/1974 | Miyake | 318/139 |
| 3,843,912 | 10/1974 | Anderson | 318/341 |

FOREIGN PATENT DOCUMENTS 2,346,975  9/1973  Germany ............................ 318/341

Primary Examiner—Robert K. Schaefer
Assistant Examiner—Eugene S. Indyk
Attorney, Agent, or Firm—Cushman, Darby & Cushman

[57] ABSTRACT

A chopper control system for controlling the amount of power supplied from a DC power source to a load having inductance. The chopper control system comprises a chopper circuit for accomplishing the on-off control of main current flowing from a DC power source to a load having inductance, and a duty cycle control circuit for controlling the duty cycle of the chopper circuit. A flywheel circuit including a series-connected circuit of a flywheel diode and a reactor is connected in inverse parallel with the load. The counter electromotive force induced in the flywheel circuit is detected by a detecting circuit and the output of the detecting circuit is applied to the duty cycle control circuit to prevent the main current from exceeding a predetermined value.

11 Claims, 4 Drawing Figures

CHOPPER CONTROL SYSTEM

BACKGROUND OF THE INVENTION

1. Field of the Invention

The present invention relates to improvements in and relating to the current limiting circuit portion of a chopper control system connected to a load having inductance such as a DC motor.

2. Description of the Prior Art

In a known type of chopper control system, the main current flowing through a DC power source, a main circuit switch, a load and a chopper circuit whose duty cycle is controlled by an on-pulse oscillator circuit and an off-pulse oscillator circuit, is detected by a resistor connected in series with these elements so that when the detected output reaches a predetermined value, a current limiting circuit is brought into operation to act on the off-pulse oscillator circuit and the duty cycle of the chopper circuit is restrained to prevent the main current from exceeding the predetermined value.

With the conventional system of the above-mentioned construction, however, it is essential to use a main current detecting resistor inserted in series in the main circuit so that the use of a detecting resistor with a high resistance value results in a loss of the main power, whereas the use of a detecting resistor having a low resistance value causes the current limiting circuit to operate erroneously due to a noise signal. Thus, there is a disadvantage that the types of resistor which can be used for such detecting resistor are limited with the resulting increase in costs, increased space required for mounting a large detecting resistor and so on.

SUMMARY OF THE INVENTION

It is an object of the present invention to provide a chopper control system which has a reduced power loss.

It is another object of the invention to provide a chopper control system wherein a flywheel circuit includes a series circuit of a flywheel diode and a reactor which is connected in inverse parallel with a load having inductance and the counter electromotive force induced in the reactor is detected and applied to a duty cycle control circuit for a chopper circuit thereby limiting the flow of current in the main circuit.

It is still another object of the invention to provide such chopper control system wherein the load consists of a DC motor having its armature and field coils connected in series with each other and the armature coil further connected in inverse parallel with the flywheel diode, and the counter electromotive force induced in the flywheel diode is detected simultaneously with the detection of the counter electromotive force in the reactor thereby accomplishing the plugging control for the plugging of the motor simultaneously with the limiting of the current flow in the main circuit.

In accordance with the present invention, the amount of current in the main circuit is detected in accordance with the counter electromotive force induced in the reactor inserted in the flywheel circuit for the load having the inductance.

Thus the chopper control system according to the invention has among its great advantages the fact that the use of a detecting resistor which has heretofore been essential in the prior art is eliminated thereby reducing the power loss and making the system inexpensive and compact.

DESCRIPTION OF THE PREFERRED EMBODIMENTS

The present invention will now be described in greater detail with reference to the illustrated embodiments.

Figure 1:
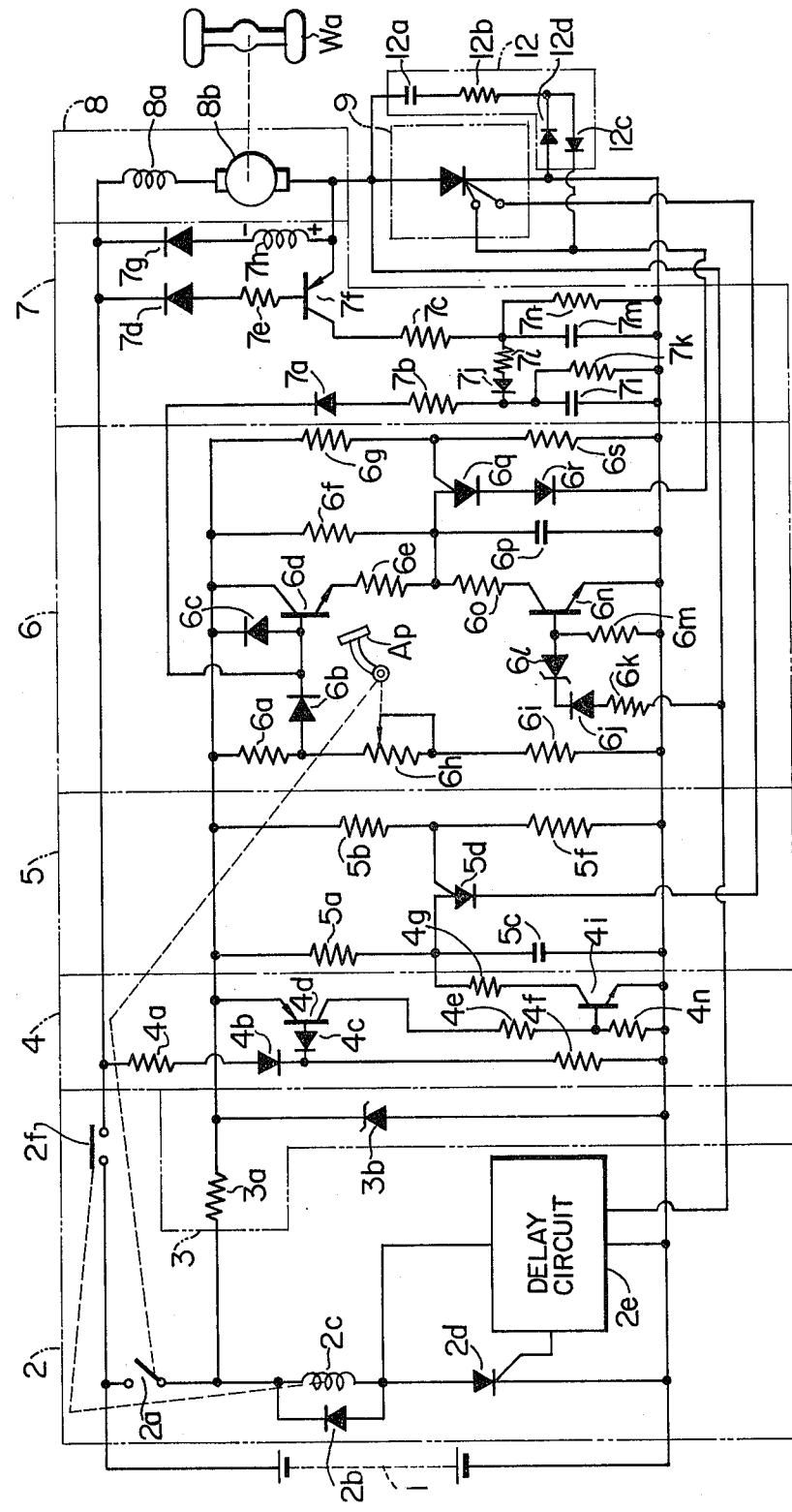
FIG. 1 is a circuit diagram showing a first embodiment of a chopper control system according to the invention.

The first embodiment of the system shown in FIG. 1 with be described first. In the Figure, numeral 1 designates a DC power source, 2 a starting circuit comprising a starting switch 2a which is closed in response to a slight depression of an accelerator pedal $A_p$, a diode 2b connected in series with the starting switch 2a, an energizing coil 2c with which the diode 2b is connected in inverse parallel, a semiconductor switch 2d consisting of a thyristor connected in series with the energizing coil 2c, a delay circuit 2e connected to the gate of the semiconductor switch 2d and a main circuit switch 2f which is closed upon energization of the energizing coil 2c. Numeral 3 designates a constant voltage circuit comprising a series connected circuit of a resistor 3a and a Zener diode 3b connected in series with the starting switch 2a for producing a constant voltage output. Numeral 4 designates an on-pulse suppressor circuit comprising a series connected circuit of a resistor 4a, a diode 4b and a resistor 4f connected in series with the main circuit switch 2f, a series connected circuit of a transistor 4d and resistors 4e and 4h connected to the cathode of the Zener diode 3b of the constant voltage circuit 3, a diode 4c connected between the cathode of the diode 4b and the base of the transistor 4d and a series connected circuit of a transistor 4i having its base connected to the juncture of the resistors 4e and 4h and a resistor 4g. With this on-pulse suppressor circuit 4, when both of the starting switch 2a and the main circuit switch 2f are open, the supply voltage is not applied to the transistors 4d and 4i causing the latter to become nonconductive. On the other hand, when the starting switch 2a is closed with the main circuit switch 2f remaining open, the power supply voltage is applied from the constant voltage circuit 3 to the transistors 4d and 4i and the base of the transistor 4d is held at the ground potential thus causing the transistors 4d and 4i to become conductive. When the starting switch 2a and the main circuit switch 2f are both closed, the voltage from the DC power source 1 is applied to the base of the transistor 4d through the main circuit switch 2f and the resistor 4a causing the transistors 4d and 4i to become nonconductive. Numeral 5 designates an on-pulse oscillator circuit comprising a series connected circuit of a resistor 5a and a capacitor 5c and a series connected circuit of resistors 5b and 5f connected to the cathode of the Zener diode 3b of the constant voltage circuit 3 and a programmable unijunction transistor 5d (the tradename and hereinafter simply referred to as a PUT) having its anode connected to the juncture of the resistor 5a and the capacitor 5c and its gate connected to the juncture of the resistors 5b and 5f, and the series connected circuit of the resistor 4g and the transistor 4i in the on-pulse suppressor circuit 4 is connected in parallel between the terminals of the capacitor 5c. With the on-pulse oscillator circuit 5, when the constant voltage circuit 3 generates its constant voltage circuit 3 generates its constant voltage output the transistor 4i of the on-pulse suppressor circuit 4 remaining in the off condition, the capacitor 5c is charged from the constant voltage circuit 3 through the resistor 4a so that at the instant that the anode potential of the PUT 5d connected to the capacitor 5c becomes, after a predetermined time, higher than the gate potential of the PUT 5d which has been preset by the resistors 5b and 5f in response to the charging of the capacitor 5c, the PUT 5d is turned on thus generating at the cathode thereof a pulse output voltage corresponding to the charge stored in the capacitor 5c (hereinafter simply referred to as an "on" pulse). If, at the time the transistor 4i of the on-pulse suppressor circuit 4 is in the conductive state, a discharging circuit including the resistor 4g and the transistor 4i is provided for the capacitor 5c so that the anode potential of the PUT 5d is prevented from exceeding the gate potential thereof and consequently the on-pulse oscillator circuit 5 produces no "on" pulse when the transistor 4i is in the conductive state. Numeral 6 designates an off-pulse oscillator circuit comprising a series connected circuit of a resistor 6a, a variable resistor 6h whose resistance value varies in accordance with the amount of depression of the accelerator pedal $A_p$ and a resistor 6i connected to the cathode of the Zener diode 3b of the constant voltage circuit 3, a series connected circuit of a transistor 6d, resistors 6e and 6o and a transistor 6n, a series connected circuit of a resistor 6f and a capacitor 6p, a series connected circuit of resistors 6g and 6s, a diode 6b having its anode connected to the juncture of the resistor 6a and the variable resistor 6h and its cathode connected to the base of the transistor 6d, a diode 6c connected in inverse parallel between the collector and base of the transistor 6d, a series connected circuit of a Zener diode 6l, a diode 6j and a resistor 6k connected in series with the base of the transistor 6n, a resistor 6m connected between the base and emitter of the transistor 6n, a PUT 6q having its anode connected to the juncture of the resistors 6e and 6o and the juncture of the resistor 6f and the capacitor 6p and its gate connected to the juncture of the resistors 6g and 6s and a diode 6r connected to the cathode of the PUT 6q. With the off-pulse oscillator circuit 6, when the transistors 6n is turned off with the constant voltage circuit 3 generating its constant voltage output, the capacitor 6p is charged from the constant voltage circuit 3 through the transistor 6d and the parallel circuit of the resistors 6e and 6f so that when the anode potential of the PUT 6q connected to the capacitor 6p becomes higher than its gate potential which has been preset by the resistors 6g and 6s in response to the charging of the capacitor 6p, the PUT 6q is turned on and a pulse output voltage corresponding to the charge stored in the capacitor 6p (hereinafter simply referred to as an "off" pulse) is generated across the diode 6r connected to the cathode of the PUT 6q. When, in this condition, a voltage which is higher than a predetermined value is applied to the Zener diode 6l through the resistor 6k and the diode 6j, the Zener diode 6l is turned on and the transistor 6n is turned on. Consequently, a discharging circuit comprising the resistor 6o and the transistor 6n is completed for the capacitor 6p so that the anode potential of the PUT 6q is prevented from exceeding its gate potential and thus the off-pulse oscillator circuit 6 generates no "off" pulse when the transistor 6n is in the conductive state. Also in this off-pulse oscillator circuit 6, the resistance value of the variable resistor 6h is changed in accordance with the amount of depression of the accelerator pedal $A_p$ (the resistance value decreases as the amount of depression of the accelerator pedal $A_p$ increases) so that the base potential of the transistor 6d is varied to change the emitter potential of the transistor 6d in accordance with the amount of depression of the accelerator pedal $A_p$ (the emitter potential decreases as the amount of depression of the accelerator pedal $A_p$ increases) and the charging rate of the capacitor 6p is changed in accordance with the amount of depression of the accelerator pedal $A_p$ thereby causing the oscillation period of the "off" pulses from the off-pulse oscillator circuit 6 to change (the oscillation period increases as the amount of depression of the accelerator pedal increases). Numeral 7 designates a current limiting circuit comprising a series connected circuit of a diode 7a, a resistor 7b and a capacitor 7i connected to the base of the transistor 6d, a resistor 7k connected in parallel with the capacitor 7i, a series connected circuit of a diode 7j, a resistor 7l and a capacitor 7m connected in parallel with the capacitor 7i, a resistor 7n connected in parallel with the capacitor 7m, a series connected circuit of a resistor 7c, a transistor 7f, a reactor 7h and a flywheel diode 7g connected in series with the resistor 7n and a series connected circuit of a diode 7d and a resistor 7e connected at one end to the main circuit switch 2f and the cathode of the flywheel diode 7g and at the other end to the base of the transistor 7f. In this current limiting circuit 7, the series connected circuit of the reactor 7h and the flywheel diode 7g constitute a flywheel circuit and the remainder of the circuit constitutes a detecting circuit for detecting the counter electromotive force induced in the reactor 7h. Thus, with the current limiting circuit 7, when the counter electromotive force induced with the polarity shown in the reactor 7h exceeds a predetermined value, the potential difference between the emitter and base of the transistor 7f exceeds a present value so that the transistor 7f is turned on and a charging current flows to the capacitor 7m from the DC power source 1 through the transistor 7f and the resistor 7c. Thus, the capacitor 7m charges and discharges in accordance with the conduction and nonconduction of the transistor 7f (the stored charge on the capacitor 7m is discharged through the resistor 7n when the transistor 7f is turned off) and the voltage on the capacitor 7m is smoothed out by a smoothing circuit comprising the resistor 7l, the diode 7j, the capacitor 7i and the resistor 7k. The capacitor 7i is charged to a voltage corresponding to the duty cycle of the transistor 7f and this capacitor voltage is applied to the base of the transistor 6d in the off-pulse oscillator circuit 6 through the resistor 7b and the diode 7a to increase the emitter potential of the transistor 6d and thereby to decrease the oscillation period of the off-pulse oscillator circuit 6. Numeral 8 designates a DC motor or a load having an inductance which constitutes a driving source for rotating wheels Wa of an electric vehicle and it includes a series connected circuit of a field coil 8a and an armature coil 8b which is connected in series with the main circuit switch 2f and which is also connected in parallel with the series connected circuit of the flywheel diode $7g$ and the reactor $7h$ in the current limiting circuit 7. Numeral 9 designates a chopper circuit connected in series with the DC motor 8 and it is also connected to the cathode of the PUT $5d$ of the on-pulse oscillator circuit 5 and the cathode of the diode $6r$ of the off-pulse oscillator circuit 6. The on-pulse oscillator circuit 5 and the off-pulse oscillator circuit 6 constitute a duty cycle control circuit for controlling the duty cycle of the chopper circuit 9. Numeral 12 designates a differentiation circuit comprising a series connected circuit of a capacitor $12a$, a resistor $12b$ and a diode $12c$ connected between the positive side of the chopper circuit 9 and the cathode of the diode $6r$ in the off-pulse oscillator circuit 6 and a diode $12d$ having its cathode connected to the anode of the diode $12c$ and its anode connected to the negative side of the chopper circuit 9. With this differentiation circuit 12, when power is applied from the DC power source 1 to the chopper circuit 9 at the starting thereof when it is open, the capacitor $12a$ is charged through a circuit comprising the capacitor $12a$, the resistor $12b$ and the diode $12c$ and the differentiated output is generated at the output of the diode $12c$ until the capacitor $12a$ is fully charged. When the chopper circuit 9 eventually comes into operation, the stored charge on the capacitor $12a$ is discharged through a circuit comprising the chopper circuit 9, the diode $12d$ and the resistor $12b$ and the stored charge disappears.

Figure 2A:
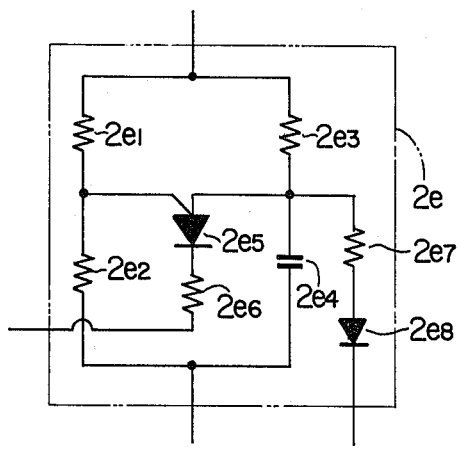
FIG. 2A is a circuit diagram showing an embodiment of the delay circuit used in the system of the invention shown in FIG. 1.

FIG. 2A shows an embodiment of the detailed circuit of the delay circuit $2e$ in the starting circuit 2, which comprises a series connected circuit of resistors $2e_1$ and $2e_2$ and a series connected circuit of a resistor $2e_3$ and a capacitor $2e_4$ which are connected between the anode and cathode of the semiconductor switch $2d$, a PUT $2e_5$ having its gate connected to the juncture of the resistors $2e_1$ and $2e_2$ and its anode connected to the juncture of the resistor $2e_3$ and the capacitor $2e_4$, a resistor $2e_6$ connected between the cathode of the PUT $2e_5$ and the gate of the semiconductor switch $2d$, and a series connected circuit of a resistor $2e_7$ and a diode $2e_8$ connected between the anode of the PUT $2e_5$ and the resistor $6k$ of the off-pulse oscillator circuit 6 and the positive side of the chopper circuit 9. Thus, with this delay circuit $2e$, when the starting switch $2a$ is closed in the normal condition of the chopper circuit 9 with an open circuit existing between the terminals of the chopper circuit 9, the capacitor $2e_4$ is charged from the DC power source 1 through the starting switch $2a$, the energizing coil $2c$ and the resistor $2e_3$ so that when, after a predetermined time, the potential at the anode of the PUT $2e_5$ connected to the capacitor $2e_4$ becomes higher than its gate potential which has been preset by the resistors $2e_1$ and $2e_2$ in response to the charging of the capacitor $2e_4$, the PUT $2e_5$ is turned on and the stored charge on the capacitor $2e_4$ is applied to the gate of the semiconductor switch $2d$ through the anode and cathode of the PUT $2e_5$ and the resistor $2e_6$ to thereby turn on the semiconductor switch $2d$. If, in this case, a short-circuit fault has occurred in the chopper circuit 9 before the closing of the starting switch $2a$, a discharging circuit comprising the resitor $2e_7$, the diode $2e_8$ and the chopper circuit 9 is completed for the capacitor $2e_4$ so that the anode potential of the PUT $2e_5$ is prevented from exceeding its cathode potential and thus the semiconductor switch $2d$ is not turned on. In this way, it is possible to prevent a runaway of the electric vehicle upon closing the starting switch $2a$ when there is a fault in the chopper circuit 9.

Figure 2B:
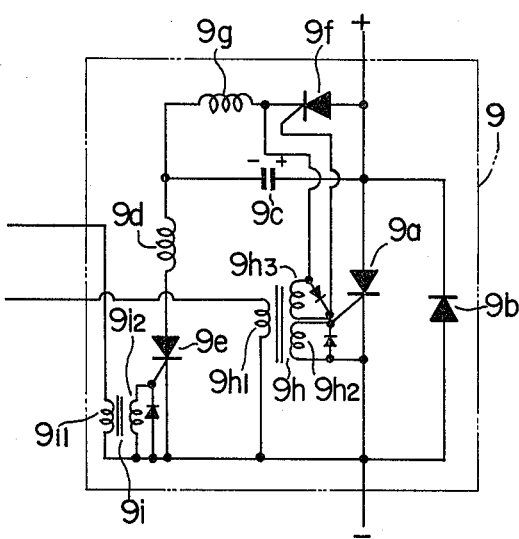
FIG. 2B is a circuit diagram showing an embodiment of the chopper circuit used in the system of the invention shown in FIG. 1.

FIG. 2B shows an embodiment of the detailed circuit of the chopper circuit 9 comprising a main thyristor $9a$ connected in series with the DC motor 8, a diode $9b$ connected in inverse parallel with the main thyristor $9a$, a series-connected circuit of a commutation capacitor $9c$, a reactor $9d$ and a commutation thyristor $9e$ connected in parallel with the main thyristor $9a$, a series-connected circuit of a thyristor $9f$ and a reactor $9g$ connected in parallel with the commutation capacitor $9c$, a pulse transformer $9h$ having a primary coil $9h_1$ connected to the cathode of the PUT $5d$ in the on-pulse oscillator circuit 5 and secondary coils $9h_2$ and $9h_3$ respectively connected between the gate and cathode of the main thyristor $9a$ and the auxiliary thyristor $9f$, respectively, and a pulse transformer $9i$ having a primary coil $9i_1$ connected to the cathode of the PUT $6q$ in the off-pulse oscillator circuit 6 through the diode $6r$ and a secondary coil $9i_2$ connected between the gate and cathode of the commutation thyristor $9e$. Thus, with this chopper circuit 9, when the differentiated output of the differentiation circuit 12 is applied to the pulse transformer $9i$ at the starting of the chopper circuit 9, a gate signal is applied to the commutation thyristor $9e$ through the pulse transformer $9i$ and the commutation thyristor $9e$ is turned on. When this occurs, a current flows from the DC power source 1 of FIG. 1 through a circuit comprising the commutation capacitor $9c$, the reactor $9d$ and the commutation thyristor $9e$ and the commutation capacitor $9c$ is charged in the polarity shown. When the capacitor $9c$ is fully charged so that there is no longer any current flow to the commutation thyristor $9e$, the commutation thyristor $9e$ is automatically turned off. Then, as the "on" pulse from the on-pulse oscillator circuit 5 is applied to the pulse transformer $9h$, a gate signal is applied through the pulse transformer $9h$ to the main thyristor $9a$ and the auxiliary thryistor $9f$, respectively, and the auxiliary thyristor $9f$ and the main thyristor $9a$ are turned on. The conduction of the main thyristor $9a$ completes a closed circuit between the terminals of the chopper circuit 9 and the conduction of the auxiliary thyristor $9f$ causes the stored charge on the commutation capacitor $9c$ to flow through the auxiliary thyristor $9f$ and the reactor $9g$ thus reversing the charging polarity of the capacitor $9c$. When the charging polarity of the capacitor $9c$ is reversed completely, there is no longer any current flow through the auxiliary thyristor $9f$ and the auxiliary thyristor $9f$ is turned off automatically. Thereafter, when an "off" pulse from the off-pulse oscillator circuit 6 is applied to the pulse transformer $9i$, the commutation thyristor $9e$ is turned on as was the case when the differentiated output of the differentiation circuit 12 was applied to the commutation thyristor $9e$, so that the stored charge on the commutation capacitor $9c$ flows through a circuit comprising the reactor $9d$, the commutation thyristor $9e$ and the diode $9b$ and a reverse voltage corresponding to the forward voltage drop across the diode $9b$ is applied to the main thyristor $9a$ thereby turning it off. This nonconduction of the main thyristor $9a$ opens the circuit between the terminals of the chopper circuit 9. On the other hand, the conduction of the commutation thyristor $9e$ causes the commutation capacitor $9c$ to be charged in the polarity shown in the previously mentioned manner and the commutation thyristor $9e$ is automatically turned off when the capacitor $9c$ is charged fully. Thereafter, the chopper circuit 9 repeates its "on and off" process in response to the "on" and "off" pulses from the on-pulse and off-pulse oscillator circuits 5 and 6.

Next, the operation in general of the system of this invention shown in FIG. 1 will be described. When the accelerator pedal $A_p$ is slightly depressed to start the electric vehicle running, the starting switch 2e in the starting circuit 2 is closed so that when there is no irregularity in the chopper circuit 9, the semiconductor switch 2d is fired after the expiration of a predetermined time determined by the delay circuit 2e and a current is supplied from the DC power source 1 to the energizing coil 2c through the starting switch 2a and the semiconductor switch 2d thus closing the main circuit switch 2f. In this case, since the transistors 4d and 4i in the on-pulse suppressor circuit 4 are held in the conductive state by the closing of the starting switch 2a and the opening of the main circuit switch 2f during the time between the closing of the starting switch 2a and the closing of the main circuit switch 2f, the on-pulse oscillator circuit 5 is prevented from oscillating due to the completion by the transistor 4i and the resistor 4g of a discharging circuit for the capacitor 5c and the off-pulse oscillator circuit 6 is in condition for starting oscillations. Then, as the main circuit switch 2f is closed through the previously mentioned process, the base potential of the transistor 4d in the on-pulse suppressor circuit 4 increases so that the transistor 4d is turned off and hence the transistor 4i is also turned off thus placing the on-pulse oscillator circuit 5 in condition for starting oscillations. On the other hand, at the same time that the main circuit switch 2f is closed the differentiated output of the differentiation circuit 12 is generated so that the commutation capacitor 9c is charged as shown in FIG. 2B prior to the generation of "on" pulses from the on-pulse oscillation circuit 5. Then, when the chopper circuit 9 is by an "on" pulse from the on-pulse oscillator circuit 5, the voltage across the resistor 6k of the off-pulse oscillator circuit 6 becomes equal to the ground potential due to the making of the chopper circuit 9 and consequently the transistor 6n is turned off causing the off-pulse oscillation circuit 6 to start oscillating. In other words, by synchronizing the pulse oscillator circuits 5 and 6 with the transistor 6n through the chopper circuit 9, the pulse oscillator circuits 5 and 6 alternately oscillate and generate "on" and "off" pulses to operate the chopper circuit 9. The duty cycle of the chopper circuit 9 is varied by varying the oscillation period of "off" pulses through the variable resistor 6h of the off-pulse oscillation circuit 6 whose resistance value is varied in accordance with the amount of depression of the accelerator pedal $A_p$. Then, when the chopper circuit 9 is made in response to the "on" pulse from the on-pulse oscillation circuit 5, the main current flows from the DC power source 1 through the main circuit switch 2f, the DC motor 8 and the chopper circuit 9. When the chopper circuit 9 is broken by the "off" pulse from the off-pulse oscillator circuit 6, due to the fact that the DC motor 8 has an inductance provided by the field coil 8a and the armature coil 8b, a counter electromotive force is induced in the motor 8 and this counter electromotive force causes a flywheel current to flow through the flywheel circuit comprising the diode 7g and the reactor 7h. This flywheel current causes across the reactor 7h a counter electromotive force with the polarity shown and this counter electromotive force is substantially proportional to the flywheel current and the main current which was flowing to the DC motor 8 prior to the breaking of the chopper circuit 9. The voltage thus generated across the reactor 7h is detected by the transistor 7f so that a voltage corresponding to the counter electromotive force induced in the reactor 7h is applied to the base of the transistor 6d in the off-pulse oscillator circuit 6 through the resistors 7b, 7c, 7k, 7l and 7n, the capacitors 7i and 7m and the diodes 7a and 7j and the oscillation period of the off-pulse oscillator circuit 6 is decreased in accordance with the applied voltage thereby decreasing the duty cycle of the chopper circuit 9 and limiting the current flow in the main circuit.

On the other hand, due to the voltage caused by the counter electromotive force induced in the reactor 7h in the nonconductive condition of the chopper circuit 9, the voltage at the positive side of the chopper circuit 9 becomes substantially higher than the voltage of the DC power source 1 by an amount corresponding to the voltage caused by the counter electromotive force, and consequently the voltage across the commutation capacitor 9c of the chopper circuit 9 which is charged when the chopper circuit 9 is broken becomes higher than the voltage of the DC power source 1 by an amount corresponding to the counter electromotive force induced in the reactor 7h thereby positively turning off the main thyristor 9a of the chopper circuit 9.

Figure 3:
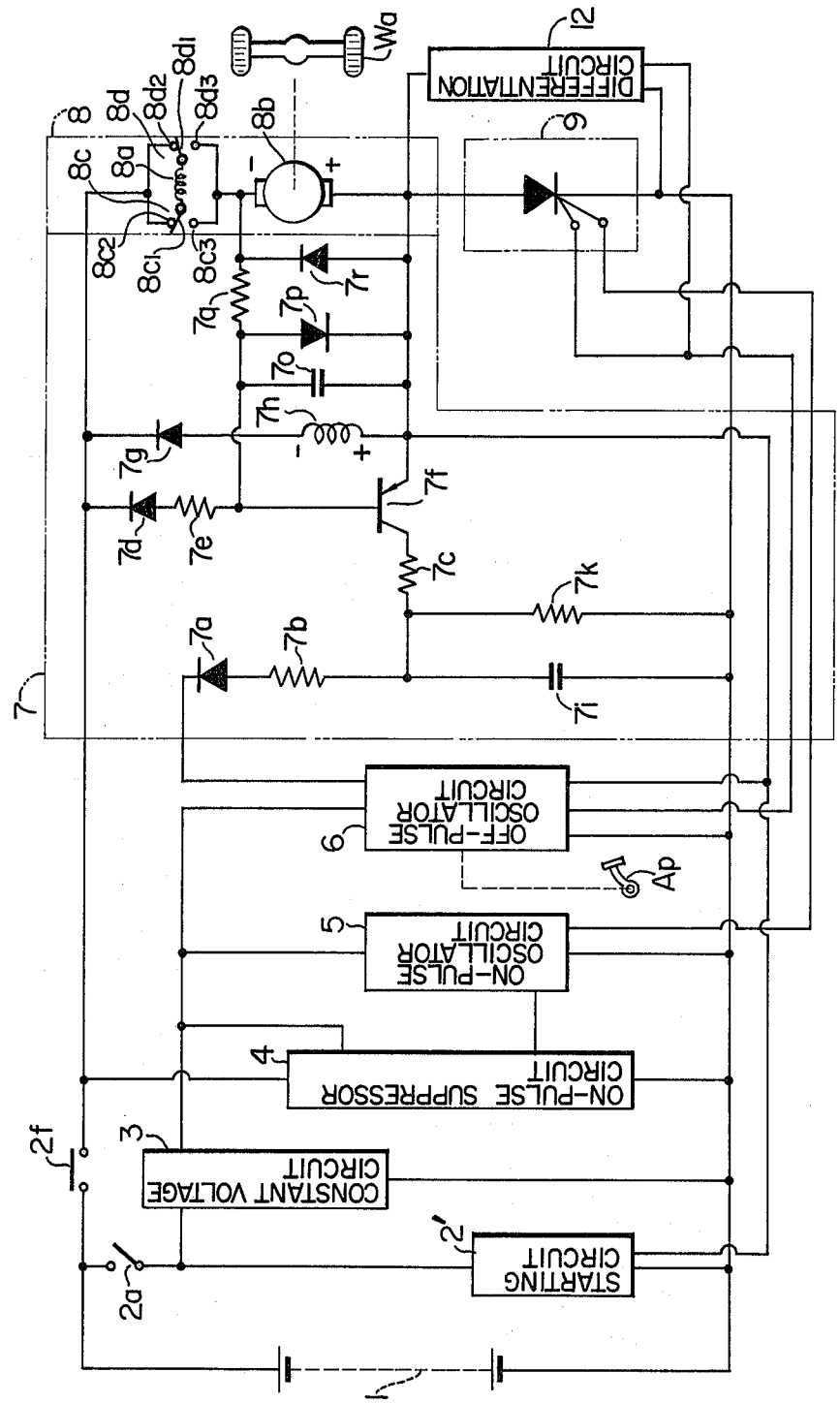
FIG. 3 is a circuit diagram showing a second embodiment of the chopper control system according to the invention.

FIG. 3 shows a second embodiment of the invention. In the Figure in which the like reference numerals as used in FIG. 1 designate the identical or equivalent parts, numeral 2' designates a starting circuit portion identical with the starting circuit 2 shown in FIG. 1 excluding the starting switch 2a and the main circuit switch 2f. Numerals 8c and 8d designate direction changing switches which are respectively provided at the ends of the field coil 8a to constitute rotational direction changing means comprising movable contacts $8c_1$ and $8d_1$ connected respectively to the ends of the field coil 8a, normally closed stationary contacts $8c_2$ and $8d_2$ which are respectively engaged with the movable contacts $8c_1$ and $8d_1$ when the latter are in the non-operated position and normally open stationary contacts $8c_3$ and $8d_3$ which are respectively engaged with the movable contacts $8c_3$ and $8d_3$ when the latter are in the operated position, whereby the direction of connection of the field coil 8a with the DC power source 1 is changed by operating the direction changing switches 8c and 8d and the movable contacts $8c_1$ and $8d_1$ are directly operated by an operating rod which is not shown or alternately the movable contacts $8c_1$ and $8d_1$ are indirectly operated by the energization of an exciting coil (not shown) caused by the operation of an operating rod. The current limiting circuit 7 further includes an armature flywheel circuit having an armature flywheel diode 7r connected in inverse parallel with the armature coil 8b, a series connected circuit of a resistor 7q and a diode 7p connected in parallel with the armature coil 8b and a capacitor 7o connected in parallel with the diode 7p and the terminals of the capacitor 7o are connected between the base and emitter of the transistor 7f.

The second embodiment is designed so that by selectively operating the direction changing switch 8c to bring its movable contact $8c_1$ into engagement with the normally open stationary contact $8c_3$ and the other direction changing switch 8d to bring its movable contact $8d_1$ into engagement with the normally open stationary contact $8d_3$, the direction of current flow from the DC power source 1 to the field coil 8a is changed so that the direction of rotation of the DC motor 8 is changed to rotate the wheels of the electric vehicle in the forward or reverse direction and in this way the electric vehicle is operated to move either forward or backward. With this second embodiment, when, with the DC motor 8 in operation, the direction changing switches 8c and 8d are respectively operated to change the direction of current flow in the field coil 8a and thereby to stop or reverse the direction of movement of the electric vehicle, the DC motor 8 now acts as a generator with the result that a voltage is developed across the armature coil 8b with the polarity shown and this voltage causes a current flow to the flywheel diode 7r. This current is detected by means of the forward voltage drop across the flywheel diode 7r and then the voltage is smoothed out by a smoothing circuit including the resistor 7q, the diode 7p and the capacitor 7o and applied between the emitter and base of the transistor 7f causing it to conduct. When this occurs, the oscillation period of the off-pulse oscillator circuit 6 is decreased and hence the duty cycle of the chopper circuit 9 is decreased thereby ensuring a smooth plugging action. In other words, in this second embodiment the main current limiting transistor 7f also acts as a control transistor for plugging purposes so that the counter electromotive force induced in the reactor 7h of the motor flywheel circuit is detected through the resistor 7e and the diode 7d for main current limiting purposes, whereas the forward voltage drop across the armature flywheel diode 7r is detected through the capacitor 7o, the diode 7p and the resistor 7q for plugging purposes, thereby operating the transistor 7f to restrict the duty cycle of the chopper circuit 9 and thereby to limit the main current or accomplish the plugging smoothly.

While, in the embodiments of the invention described hereinabove, the present invention is applied to the chopper control system of the fixed frequency, variable "on" period type in which the oscillation period of the on-pulse oscillator circuit 5 is fixed and the oscillation period of the off-pulse oscillator circuit 6 is made adjustable to thereby vary the duty cycle of the chopper circuit 9, it is of course possible to apply the invention to the chopper control system of the variable frequency, fixed "on" period type, for example, in which the oscillation frrquency of the on-pulse oscillator circuit 5 is made adjustable and the oscillation period of the off-pulse oscillator circuit 6 for generating "off" pulses in synchronism with "on" pulses is fixed.

Further, while, in the second embodiment described above, the invention is applied to the chopper control system of the type in which the direction of rotation of the DC motor 8 is changed by changing the connections of the field coil 8a through the operation of the direction changing switches 8c and 8d, of course the invention may be applied to the system of a different type wherein the connections of the armature coil 8b are changed through the direction changing switches 8c and 8d.

Still further, it is of course possible to modify the above-described embodiments so that a known type of chopper short-circuit switch which closes when the duty cycle of the chopper circuit 9 approaches the full duty cycle, is connected in parallel with the chopper circuit 9 to eliminate the power consumption of the chopper circuit 9 when its duty cycle is practically equal to the duty cycle.

Still further, it is of course possible to modify the above-described embodiments to provide a known type of commutation failure protective circuit so that when the commutation fails to take place in the chopper circuit 9, the semiconductor switch 2d of the starting circuit 2 is turned off to stop the operation of the DC motor 8.

Still further, while, in the above-described embodiments, the delay circuit 3e of the starting circuit 2 is prevented from operating only when there is a short-circuit fault in the chopper circuit 9 at the start thereof, where the previously mentioned chopper short-circuit switch or the commutation failure protective circuit is provided, it is possible to prevent the operation of the delay circuit 2e of the starting circuit 2 also when there is a short-circuit fault in a chopper short-circuit switch control circuit for controlling the chopper short-circuit switch or in the commutation failure protective circuit.

Still further, the on-pulse and off-pulse oscillator circuits 5 and 6 constituting the duty cycle control circuit for the chopper circuit 9 in the above-described embodiments are shown for illustrative purposes only and thus it is of course possible to use any other types of oscillator, while on the other hand the differentiation circuit 12 may be eliminated if the chopper circuit 9 is designed so that either one of the "on" and "off" pulses may be applied earlier than the other to the chopper circuit 9 at the start thereof.

Still further, it is a matter of course that the system of this invention is not limited to electric vehicles and the present invention is applicable to not only other DC motor control systems but also any systems for controlling the power to loads having an inductance.

We claim:

1. A chopper control system for controlling the supply of power from a DC power source to a load comprising:
   a. a main circuit including a DC power source, a chopper circuit for accomplishing the on-off control of the power from said DC power source, and a DC motor having the armature and the field coils in series with each other, said DC power source, said chopper circuit, and said DC motor being connected in series with each other, and said main circuit controlling the duration of power supply from said DC power source to said DC motor in accordance with the duty cycle of said chopper circuit;
   b. a duty cycle control circuit connected to said chopper circuit for controlling the duty cycle thereof; and
   c. a current limiting circuit including a flywheel circuit having a series-connected circuit of a flywheel diode and a reactor, said series-connected circuit being connected in inverse parallel with the series circuit of said armature coil and said field coil for including thereacross a counter electromotive force each time the power supply from said power source to said DC motor is cut off, and said current limiting circuit further including a detecting circuit connected to said flywheel circuit and said duty cycle control circuit for detecting said counter electromotive force induced in said reactor of said flywheel circuit and applying said detected output to said duty cycle control circuit, whereby the duty cycle of said chopper circuit is limited in accordance with the counter electromotive force induced in said reactor.

2. A control system according to claim 1, wherein said detecting circuit includes at least a transistor having its base-to-emitter circuit connected in parallel with said flywheel circuit, and a smoothing circuit connected to the collector circuit of said transistor and said duty cycle control circuit for smoothing out the output voltage of said transistor and limiting the output of said duty cycle control circuit in accordance with said smoothed output voltage.

3. A control system according to claim 1 further comprising starting activating means, and a starting circuit for closing said main circuit in response to the operation of said starting activating means and for opening said main circuit when there is a shortcircuit fault in said chopper circuit.

4. A control system according to claim 3, wherein said starting circuit includes a starting switch connected to said DC power source and disposed to be closed in response to the operation of said starting activating means, an energizing coil connected in series with said starting switch, a main circuit switch disposed to be closed upon energization of said energizing coil and connected in series in said main circuit, a semiconductor switching element connected in series with said series connected circuit of said starting switch and said energizing coil, and a delay circuit having the power supply side thereof connected in series with said starting switch, the input side thereof connected to said chopper circuit and the output side thereof connected to the control electrode of said semiconductor switching element whereby when there is no short-circuit fault in said chopper circuit at the time of closing said starting switch a delay action is initiated and an output signal is applied to the control electrode of said semiconductor switching element after a predetermined time to thereby turn on said semiconductor switching element.

5. A control system according to claim 4, wherein said duty cycle control circuit includes an on-pulse oscillator circuit connected to said starting switch and said chopper circuit for applying to said chopper circuit an "on" signal for making said chopper circuit when said starting switch is closed, an off-pulse oscillator circuit connected to said starting switch and said chopper circuit for applying to said chopper circuit an "off" pulse for breaking said chopper circuit when said starting switch is closed, and period changing means for changing the oscillation period of at least one of said pulse oscillator circuits, and there is further provided an on-pulse suppressor circuit connected to said main circuit switch, said on-pulse oscillator circuit and said starting switch for suppressing the oscillating action of said on-pulse oscillator circuit during the time between the closing of said starting switch and the closing of said main circuit switch.

6. A control system according to claim 5 further comprising a differentiation circuit connected to said chopper circuit for applying to said chopper circuit an "off" signal for breaking said chopper circuit in response to the appearance of a voltage across the terminals of said chopper circuit.

7. A control system according to claim 6, wherein said chopper circuit comprises a main thyristor connected in series with said main circuit, a diode connected in inverse parallel with said main thyristor, a series connected circuit of a commutation capacitor, a commutation thyristor and a reactor connected in parallel with said main thyristor, and a series connected circuit of an auxiliary thyristor and a reactor connected in parallel with said commutation capacitor, the gate circuit for said main thyristor and said auxiliary thyristor is connected to said on-pulse oscillator circuit to turn on said main thyristor and said auxiliary thyristor in response to the supply of an "on" pulse from said on-pulse oscillator circuit to said gate circuit, and said commutation thyristor is connected to said off-pulse oscillator circuit to be turned on in response to the supply of an "off" pulse from said off-pulse oscillator circuit to said gate circuit.

8. A chopper control system for controlling the supply of power from a DC power source to a DC motor comprising:
(a) a main circuit including a DC power source, a chopper circuit for accomplishing the on-off control of the power from said DC power source and a DC motor having the armature and field coils thereof connected in series with each other, said DC power source, said chopper circuit and said DC motor being connected in series with each other, whereby the duration of power supply from said DC power source to said DC motor is controlled in accordance with the duty cycle of said chopper circuit;
(b) a duty cycle control circuit connected to said chopper circuit for controlling the duty cycle thereof;
(c) rotational direction changing means connected to said DC motor for changing the direction of rotation of said DC motor; and
(d) a current limiting circuit including a motor flywheel circuit having a series-connected circuit of a motor flywheel diode and a reactor, said series-connected circuit being connected in inverse parallel with a series circuit of the armature coil and the field coil of said DC motor for inducing thereacross a counter electromotive force each time the power supply from said DC power source to said DC motor is cut off, an armature flywheel circuit having an armature flywheel diode connected in inverse parallel with the armature coil of said DC motor for receiving a counter electromotive force induced by said armature coil when the direction of said DC motor is changed, and a detecting circuit connected to said flywheel circuits and said duty cycle control circuit for selectively detecting said counter electromotive forces across said motor flywheel circuit and said armature flywheel circuit and applying the resulting detected output to said duty cycle control circuit, whereby the duty cycle of said chopper circuit is limited in accordance with the counter electromotive force induced in said reactor of said motor flywheel circuit and the forward voltage across the armature flywheel diode of said armature flywheel circuit, respectively.

9. A control system according to claim 8, wherein said detecting circuit includes at least a first smoothing circuit connected in parallel with said armature flywheel diode for smoothing out the forward voltage thereacross, a transistor having the base-to-emitter circuit thereof connected in parallel with said first smoothing circuit and said motor flywheel circuit, and a second smoothing circuit connected to the collector circuit of said transistor and said duty cycle control circuit for smoothing out the output voltage of said transistor and limiting the output of said duty cycle control circuit in accordance with said smoothed transistor output voltage.

10. A control system according to claim 9 further comprising a plurality of wheels connected to said DC motor to be driven thereby, and an accelerator pedal for operating said duty cycle control circuit.

11. A control system according to claim 8, wherein said chopper circuit includes a thyristor chopper including a commutation circuit having a commutation capacitor disposed to be charged through said DC motor.

* * * * *